(No Model.)
A. GRAFF.
PNEUMATIC TIRE.
No. 568,564.  Patented Sept. 29, 1896.
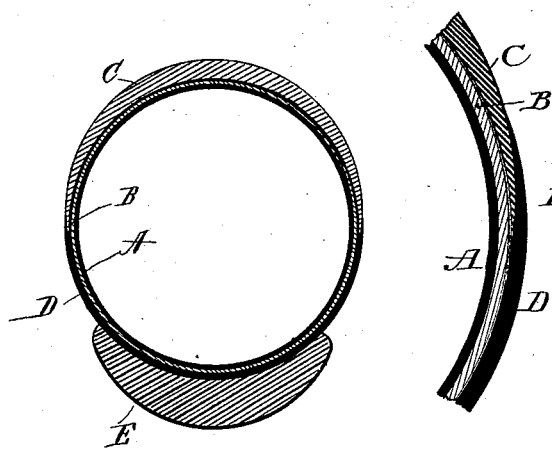
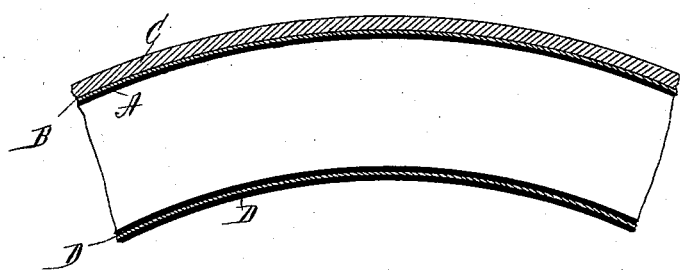
WITNESSES:
John Buckler,
C. Gerst.
INVENTOR
Andrew Graff,
BY Edgar Tate & Co
ATTORNEYS.

UNITED STATES PATENT OFFICE.

ANDREW GRAFF, OF BROOKLYN, NEW YORK.

PNEUMATIC TIRE.

SPECIFICATION forming part of Letters Patent No. 568,564, dated September 29, 1896.

Application filed October 11, 1895. Serial No. 565,388. (No model.)

*To all whom it may concern:*

Be it known that I, ANDREW GRAFF, a citizen of the United States, and a resident of Brooklyn, in the county of Kings and State of New York, have invented certain new and useful Improvements in Pneumatic Tires for Bicycles and other Vehicles, of which the following is a specification, reference being had to the accompanying drawings, forming a part thereof, in which similar letters of reference indicate corresponding parts.

My invention relates to pneumatic tires for bicycles and other vehicles, and the object thereof is to provide a hose-pipe tire that is strong, light, rapid, and that can be inflated, as in all rubber pneumatic tires.

With these and other objects in view my invention consists in the construction, arrangement, and combination of parts, as will hereinafter be more particularly described in the specification and illustrated in the accompanying drawings, in which—

Figure 1 is a transverse section of my improved tire and a section of the rim of a wheel. Fig. 2 is a longitudinal section of a portion of the tire; and Fig. 3 is a section of a portion of the tire, showing the skived edges of the leather reinforcing strip or tread and the overlapping layer of rubber.

In the practice of my invention I provide a tire which is tubular in form and which is composed of a rubber tube A, which surrounds the heavy canvas tube B, and secured to the said tube B, and extending entirely around the bearing-surface thereof, about half-way around the tire in cross-section, is the reinforcing or bearing strip or section C, made of heavy sole-leather. This reinforcing bearing-surface sectional strip C is formed of heavy harness, hemlock, or oak-tanned sole-leather, but preferably of oak-tanned sole-leather, which is rendered soft and flexible by treatment, whereby elasticity and flexibility is given to the tire, and at the same time a covering or bearing surface provided to prevent excessive wear upon the bearing-surface of the tire, and thereby prevent the tire from being punctured or in any way injured.

The construction of my improved tire is as follows: A heavy strip of thick duck or canvas which has been previously put through a waterproof process is put upon a mold the exact shape and size of the tire needed, a strip of heavy leather, preferably oak-tanned sole-leather, is cut about one-half the width of the tire required. After the leather has been prepared and the sides of the leather strip have been shaved in or skived it is molded into the shape required over the canvas. It is then cemented to the canvas, and after drying it is then sewed along the edges of the leather with one or more rows of stitches, securing it permanently to the canvas, after which a very thin sheet of rubber is cemented to the inside of the canvas—the canvas now with a thin lining of rubber—the ends are overlapped and cemented down securely, after which the outside of the canvas and also a portion of the leather at the side where it has been skived or thinned on the edges are given one or more coats of cement and left to dry thoroughly. A strip of sheet-rubber is now cut to the required size to cover part of the leather and all of the canvas, is given one or more coats of cement, and when dry the rubber strip is put over the canvas, completely covering it and also projecting slightly upon the leather. The cement upon the rubber sheeting and the canvas both being dry, they are put together, adhere firmly and securely, so much so that it is impossible to pull them apart without tearing one or the other, thereby making the tire both water and air tight.

My invention relates to an improvement in pneumatic tires for bicycle-wagons and all kinds of wheeled vehicles, and the object of my invention is to provide a tire that is speedier, lighter, stronger, and cheaper than any heretofore used and that cannot be punctured, a tire made of canvas, with a thin sheet of rubber for a lining, with a sole-leather tread or leather reinforcing-strip, which prevents the tire from being punctured, and forming a tire that can be readily inflated.

As thus constructed there is comparatively no danger of my improved tire being punctured by glass, tacks, or sharp-angled stones, or otherwise being rendered useless by accidents, as is frequently the case with pneumatic rubber tires as now constructed, and the necessity of frequently repairing the same or producing a new tire is in a great measure almost entirely avoided.

Various changes may be made in the construction and arrangement of the tire as fairly come within the scope of my invention.

Having described my invention, what I claim, and desire to secure by Letters Patent, is—

In pneumatic tires for bicycles and other vehicles, the combination of the inner rubber tube, A, the thick canvas or duck tube, B, rendered waterproof, a reinforcing section or strip of heavy sole-leather, the edges of which are thinned or skived down, secured to the outside of the said tube of canvas or duck, and a covering or layer of rubber attached to the canvas and extending partially upon the edges of the leather, substantially as herein shown and described.

In testimony that I claim the foregoing as my invention I have signed my name, in presence of the subscribing witnesses, this 10th day of October, 1895.

ANDREW GRAFF.

Witnesses:
C. GERST,
K. ENSLIE.